United States Patent
Seo et al.

(10) Patent No.: US 10,218,527 B2
(45) Date of Patent: Feb. 26, 2019

(54) METHOD AND APPARATUS FOR SETTING SUB-FRAME FOR SUPPORTING MBMS

(71) Applicant: LG ELECTRONICS INC., Seoul (KR)

(72) Inventors: Dongyoun Seo, Seoul (KR); Yunjung Yi, Seoul (KR); Bonghoe Kim, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 168 days.

(21) Appl. No.: 14/889,690

(22) PCT Filed: May 9, 2014

(86) PCT No.: PCT/KR2014/004125
§ 371 (c)(1),
(2) Date: Nov. 6, 2015

(87) PCT Pub. No.: WO2014/182105
PCT Pub. Date: Nov. 13, 2014

(65) Prior Publication Data
US 2016/0127140 A1    May 5, 2016

Related U.S. Application Data

(60) Provisional application No. 61/821,704, filed on May 9, 2013, provisional application No. 61/830,617, filed (Continued)

(51) Int. Cl.
*H04L 12/18* (2006.01)
*H04J 11/00* (2006.01)
(Continued)

(52) U.S. Cl.
CPC ......... *H04L 12/189* (2013.01); *H04B 7/2656* (2013.01); *H04J 11/00* (2013.01);
(Continued)

(58) Field of Classification Search
CPC ..................................................... H04J 11/00
See application file for complete search history.

(56) References Cited

U.S. PATENT DOCUMENTS

2011/0243056 A1   10/2011 Jen
2011/0317610 A1   12/2011 Park et al.
(Continued)

FOREIGN PATENT DOCUMENTS

| KR | 10-2010-0117046 A | 11/2010 |
| WO | WO 2010/126280 A2 | 11/2010 |
| WO | WO 2012/134115 A2 | 10/2012 |

OTHER PUBLICATIONS

Ericsson et al., "On EMBMS and EPMCH operations for NCT", R1-131451, 3GPP TSG-RAN WG1 #72bis, Chicago, USA, Apr. 15-19, 2013, see p. 2.

*Primary Examiner* — Huy D Vu
*Assistant Examiner* — Kevin M Cunningham
(74) *Attorney, Agent, or Firm* — Birch, Stewart, Kolasch & Birch, LLP

(57) ABSTRACT

Provided are a method for setting a sub-frame for supporting a multimedia broadcast multicast service (MBMS) in a wireless communications system, and an apparatus using the same. The method includes receiving multicast broadcast single frequency network (MBSFN) information instructing a sub-frame which is set as an MBSFN sub-frame in a frame, and receiving a signal using an extended cyclic prefix (CP) in the sub-frame instructed by the MBSFN information, wherein the sub-frame which is set as the MBSFN sub-frame indicates only the sub-frame participating in the MBMS.

4 Claims, 17 Drawing Sheets

Related U.S. Application Data on Jun. 3, 2013, provisional application No. 61/837,175, filed on Jun. 20, 2013.

(51) Int. Cl.
| | | |
|---|---|---|
| *H04B 7/26* | (2006.01) | |
| *H04L 27/26* | (2006.01) | |
| *H04W 4/06* | (2009.01) | |
| *H04W 72/00* | (2009.01) | |

(52) U.S. Cl.
CPC ........... *H04L 27/2607* (2013.01); *H04W 4/06* (2013.01); *H04W 72/005* (2013.01)

(56) References Cited

U.S. PATENT DOCUMENTS

| | | | |
|---|---|---|---|
| 2012/0039233 A1 | 2/2012 | Kim et al. | |
| 2012/0039292 A1* | 2/2012 | Lee, II | H04L 27/2607 370/329 |
| 2014/0086173 A1* | 3/2014 | Sadeghi | H04L 5/005 370/329 |
| 2014/0204825 A1* | 7/2014 | Ekpenyong | H04L 5/001 370/312 |
| 2016/0013977 A1* | 1/2016 | Hu | H04W 72/005 370/329 |

\* cited by examiner

METHOD AND APPARATUS FOR SETTING SUB-FRAME FOR SUPPORTING MBMS

CROSS REFERENCE TO RELATED APPLICATIONS

This application is the National Phase of PCT International Application No. PCT/KR2014/004125, filed on May 9, 2014, which claims priority under 35 U.S.C. 119(e) to U.S. Provisional Application Nos. 61/821,704 filed on May 9, 2013, 61/830,617 filed on Jun. 3, 2013 and 61/837,175 filed on Jun. 20, 2013, all of which are hereby expressly incorporated by reference into the present application.

BACKGROUND OF THE INVENTION

Field of the Invention

The present invention relates to wireless communication and, more particularly, to a method and an apparatus for setting a subframe for supporting MBMS.

Related Art

The Long Term Evolution (LTE) standard developed by the $3^{rd}$ Generation Partnership Project (3GPP) is part of the Evolved-UMTS (E-UMTS) specification based on Evolved-Universal Terrestrial Radio Access Network (E-UTRAN). The LTE system employs Orthogonal Frequency Division Multiple Access (OFDMA) for downlink and Single Carrier-Frequency Division Multiple Access (SC-FDMA) for uplink. The LTE-Advanced (LTE-A) is an evolved version of the LTE system.

A system supporting the LTE/LTE-A standard transmits a reference signal and a control channel through a downlink carrier. For example, a Cell-specific RS (CRS), Primary Synchronization Signal (PSS)/Secondary Synchronization Signal (SSS), Physical Downlink Control Channel (PD-CCH), and Physical Broadcast Channel (PBCH) are transmitted. The standard specification defines in which way the reference signals and control channels are allocated and transmitted through carriers.

In a future wireless communication system, a new type of carrier may be introduced, which transmits only part or none of the aforementioned reference signals and control channels. This feature is intended to improve an interference problem among a plurality of cells and to improve scalability among carriers. A new carrier having the feature above is called an extension carrier or a New Carrier Type (NCT).

Meanwhile, the LTE/LTE-A supports Multimedia Broadcast Multicast Service (MBMS). In the prior art, the MBMS is specified based on the channel structure and reference signal transmission with respect to existing carriers. However, since a channel structure and reference signal transmission different from the existing carriers can be used for the NCT, it may be difficult to apply the existing MBMS method to the NCT in the same manner.

Therefore, a method and an apparatus for the NCT to support the MBMS are needed.

SUMMARY OF THE INVENTION

The present invention provides a method and an apparatus for setting a subframe for supporting MBMS.

In an aspect, provided is a method for setting a subframe for Multimedia Broadcast Multicast Service (MBMS) in a wireless communication system.

The method includes receiving Multicast Broadcast Single Frequency Network (MBSFN) information indicating a subframe configured as an MBSFN subframe within a frame and receiving a signal using a Cyclic Prefix (CP) in a subframe indicated by the MBSFN information. Only a subframe participating in MBMS is indicated as the subframe configured as the MBSFN subframe.

In another aspect, provided is an apparatus for setting a subframe for a Multimedia Broadcast Multicast Service (MBMS) in a wireless communication system. The apparatus includes a Radio Frequency (RF) unit transmitting and receiving a radio signal and a processor connected to the RF unit. The processor is configured to receive Multicast Broadcast Single Frequency Network (MBSFN) information indicating a subframe configured as an MBSFN subframe within a frame and to receive a signal using an extended Cyclic Prefix (CP) indicated by the MBSFN information. Only a subframe participating in MBMS is indicated as the subframe configured as the MBSFN subframe.

The present invention can effectively support MBMS even for a new carrier which uses a channel structure and a reference signal transmission method different from existing carriers.

DESCRIPTION OF EXEMPLARY EMBODIMENTS

User Equipment (UE) can be fixed or can have mobility. UE can also be called another term, such as a Mobile Station (MS), a Mobile Terminal (MT), a User Terminal (UT), a Subscriber Station (SS), a wireless device, a Personal Digital Assistant (PDA), a wireless modem, or a handheld device.

The BS commonly refers to a fixed station that communicates with UE. The BS can also be called another tem, such as an evolved-NodeB (eNodeB), a Base Transceiver System (BTS), or an access point.

Communication from a BS to UE is called downlink (DL), and communication from UE to a BS is called uplink (UL). A wireless communication system including a BS and UE can be a Time Division Duplex (TDD) system or a Frequency Division Duplex (FDD) system. A TDD system is a wireless communication system that performs UL and DL transmission/reception using different times in the same frequency band. An FDD system is a wireless communication system that enables UL and DL transmission/reception at the same time using different frequency bands. A wireless communication system can perform communication using radio frames.

Figure 1:
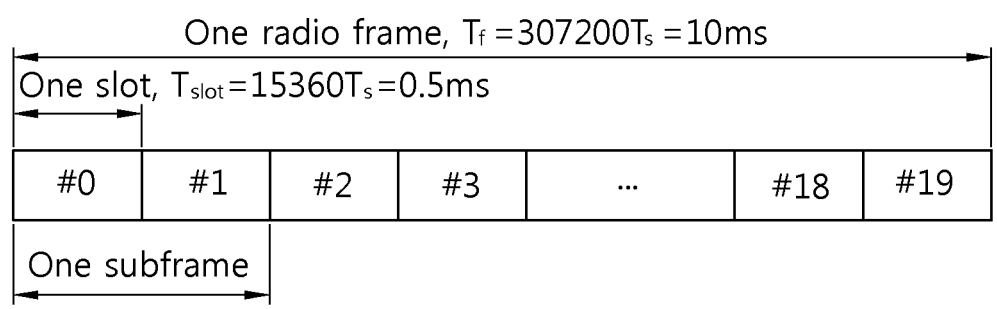
FIG. 1 shows the structure of an FDD radio frame.

FIG. 1 shows the structure of an FDD radio frame.

An FDD radio frame (in what follows, it is called an FDD frame for short) consists of 10 subframes, and one subframe comprises two consecutive slots. Slots included in an FDD frame can be indexed with 0 to 19. The time interval required for one subfame to be transmitted is called a transmission time interval (TTI), and the TTI can be used as a minimum scheduling unit. For example, length of one subframe can be 1 ms, and length of one slot can be 0.5 ms. If length of a radio frame is denoted by $T_f$, $T_f$ can be 307200 $T_s$, which is equal to 10 ms.

In the FDD frame, downlink subframes and uplink subframes can be placed in a consecutive manner in the respective frequency bands. In other words, the FDD frame includes 10 downlink subframes in a first frequency band and 10 uplink subframes in a second frequency band. Downlink subframes and uplink subframes within the FDD frame can be indexed sequentially from 0 to 9.

Figure 2:
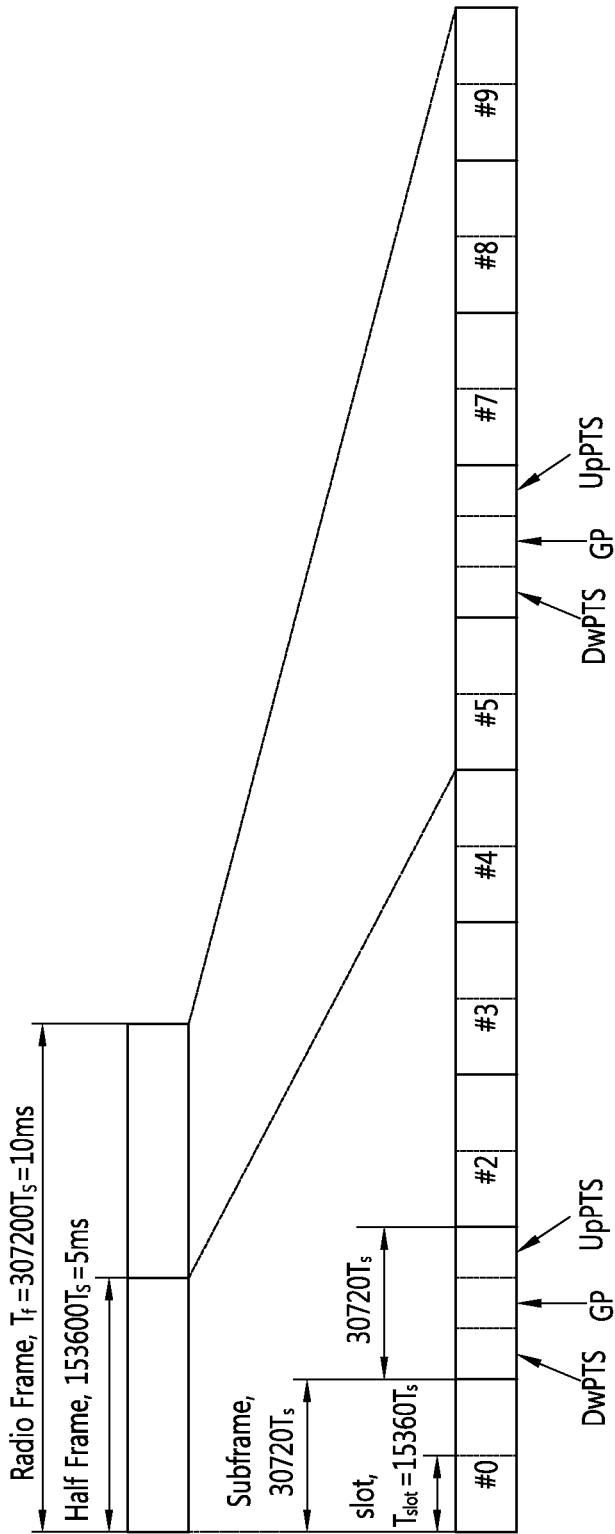
FIG. 2 shows the structure of a TDD radio frame.

FIG. 2 illustrates a structure of a TDD radio frame.

With reference to FIG. 2, a TDD radio frame (in what follows, it is called a TDD frame) comprises two half-frames, and one half-frame comprises 5 subframes, thereby comprising a total of 10 subframes. A TDD frame includes a uplink (UL) subframe, a downlink (DL) subframe, and a special (S) subframe within the same frequency band. If subframes of a TDD frame are indexed from 0, subframes indexed with #1 and #6 may correspond to special subframes, where a special subframe includes a downlink pilot time slot (DwPTS), a guard period (GP), and a uplink pilot time slot (UpPTS). The DwPTS is used for an intimal cell search, synchronization, or channel estimation in a user equipment; and can be used for downlink transmission. The UpPTS is used for channel estimation in a base station and uplink transmission synchronization of a user equipment, which can be used for uplink transmission. The GP is a time period defined for removing interference generated in a uplink due to multi-path delay of a downlink signal between the uplink and a downlink. The GP and the UpPTS can be used as a time gap.

As described above, a DL subframe and a UL subframe of a TDD frame coexist in the same frequency band. Table 1 shows one example of UL-DL configuration of a TDD frame.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, 'D' represents a DL subframe, 'U' a UL subframe, and 'S' a special subframe. Receiving UL-DL configuration from a base station, a user equipment can determine whether individual subframes in a TDD frame correspond to DL subframes (or S subframes) or UL subframes.

Meanwhile, a subframe can include a plurality of Orthogonal Frequency Division Multiplexing (OFDM) symbols in the time domain. Each OFDM symbol can include a Cyclic Prefix (CP). A CP is one type of a protection interval to reduce interference among OFDM symbols and can be located at the starting part of OFDM symbol. Through the CP, part of the last block of the OFDM symbol can be duplicated and transmitted. A CP can be described as a normal CP or an extended CP. In the case of a normal CP, the CP interval within an OFDM symbol may amount to 5.2 micro second (μs), while it is 16.7 μs in the case of an extended CP. When the normal CP is used, one OFDM symbol amounts to 71.9 μs; it is 83.3 μs when the extended CP is used (which is based on the assumption that subcarrier spacing is 15 kHz).

Figure 3:
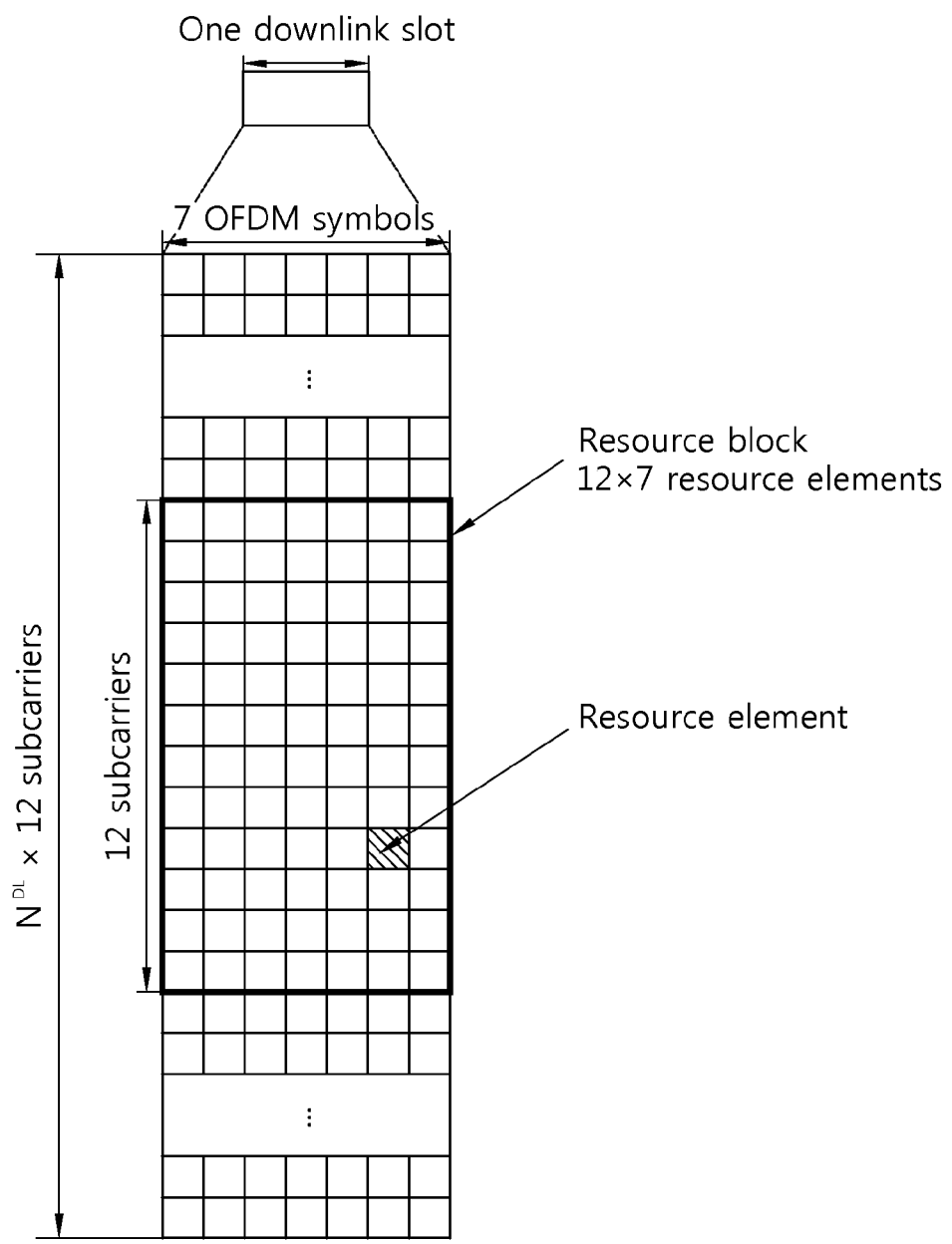
FIG. 3 shows an example of a resource grid for one downlink slot.

FIG. 3 shows an example of a resource grid for one downlink slot.

Referring to FIG. 3, the downlink slot includes a plurality of Orthogonal Frequency Division Multiplexing (OFDM) symbol in the time domain and includes $N_{RB}$ Resource Blocks (RBs) in the frequency domain. The RBs includes one slot in the time domain and a plurality of consecutive subcarrier in the frequency domain in a resource allocation unit. The number of RBs $N_{RB}$ included in the downlink slot depends on a downlink transmission bandwidth $N^{DL}$ configured in a cell. For example, in an LTE system, the $N_{RB}$ can be any one of 6 to 110. An uplink slot can have the same structure as the downlink slot.

Each element on the resource grid is called a Resource Element (RE). The RE on the resource grid can be identified by an index pair (k,l) within a slot. Here, k (k=0, $N_{RB}$×12−1) is a subcarrier index within the frequency domain, and l (l=0, . . . , 6) is an OFDM symbol index within the time domain.

Although 7×12 REs including 7 OFDM symbols in the time domain and 12 subcarrier in the frequency domain have been illustrated as being included in one RB in FIG. 3, the number of OFDM symbols and the number of subcarriers within an RB are not limited thereto. The number of OFDM symbols and the number of subcarriers can be changed in various ways depending on the length of a CP, frequency spacing, etc. In one OFDM symbol, one of 128, 256, 512, 1024, 1536, and 2048 can be selected and used as the number of subcarriers.

Figure 4:
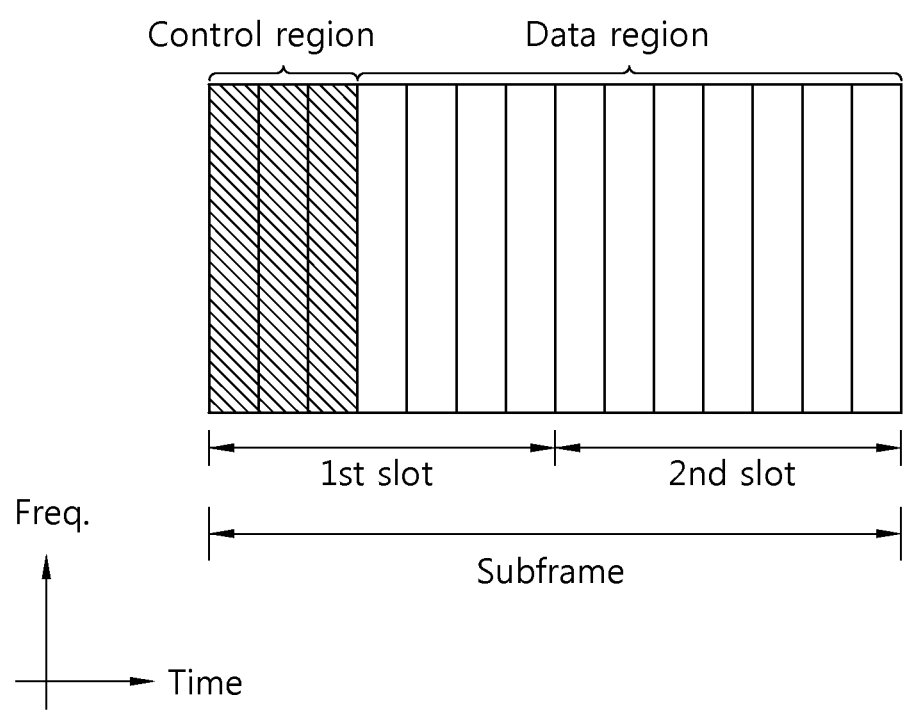
FIG. 4 shows the structure of a DL subframe.

FIG. 4 shows the structure of a DL subframe.

Referring to FIG. 4, a downlink (DL) subframe is divided into a control region and a data region in the time domain. The control region includes a maximum of former 3 (maximum 4 according to circumstances) OFDM symbols of a first slot within a subframe, but the number of OFDM symbols included in the control region can be changed. A control channel different from a physical downlink control channel (PDCCH) is allocated to the control region, and a physical downlink shared channel (PDSCH) is allocated to the data region.

A PCFICH that is transmitted in the first OFDM symbol of a subframe carries a Control Format Indicator (CFI) regarding the number of OFDM symbols (i.e., the size of a control region) that are used to send control channels within the subframe. UE first receives a CFI on a PCFICH and then monitors PDCCHs. Unlike in a PDCCH, a PCFICH is not subject to blind decoding, but is transmitted through the fixed PCFICH resources of a subframe.

A PHICH carries a positive-acknowledgement (ACK)/negative-acknowledgement (NACK) signal for an uplink Hybrid Automatic Repeat reQuest (HARQ). An ACK/NACK signal for uplink (UL) data on a PUSCH which is transmitted by UE is transmitted on a PHICH.

Control information transmitted through a PDCCH is called Downlink Control Information (DCI). DCI can include the resource allocation of a PDSCH (this is also called a DL grant), the resource allocation of a PUSCH (this is also called an UL grant), a set of transmit power control commands for individual MSs within a specific UE group and/or the activation of a Voice over Internet Protocol (VoIP).

Downlink Control Information (DCI) including a DL grant can include a HARQ process number. The DCI has 3 bits for the HARQ process number in the case of FDD, while 4 bits in the case of TDD. The UE can differentiate HARQ processes based on the HARQ process number.

The base station determines a PDCCH format according to the DCI to be sent to the UE, attaches a Cyclic Redundancy Check (CRC) to the DCI, and masks the CRC with a unique identifier (which is called a Radio Network Temporary Identifier (RNTI)) depending on the owner or intended use of the PDCCH.

In case the PDCCH is used for a specific UE, a unique identifier of the UE, for example, the CRC can be masked with a Cell-RNTI (C-RNTI). Similarly, in case the PDCCH is used for a paging message, the CRC can be masked with a paging identifier, for example, a Paging-RNTI (P-RNTI). In the case of a PDCCH for system information, the CRC can be masked with system information identifier, namely, system information-RNTI (SI-RNTI). In order to indicate a random access response, which is a response to a random access preamble of the UE, the CRC can be masked with the Random Access RNTI (RA-RNTI). If the C-RNTI is used, the PDCCH carries control information for the corresponding specific UE (which is called UE-specific control information); if a different RNTI is used, the PDCCH carries common control information that is received by all or a plurality of the UEs within the cell.

The base station encodes CRC-added DCI and generates coded data. The encoding includes channel coding and rate matching. Afterwards, the base station modulates coded data, generates modulated symbols, and transmits the modulated symbols by mapping them into physical resource elements (REs).

The PDSCH transmitted in the data region is a downlink data channel. System information, data, and so on can be transmitted through the PDSCH. And the PBCH carries system information essential for the UE to communicate with the base station, where the system information transmitted through the PBCH is called a Master Information Block (MIB). Similarly, the system information transmitted on the PDSCH specified by the PDCCH is called a System Information Block (SIB).

Figure 5:
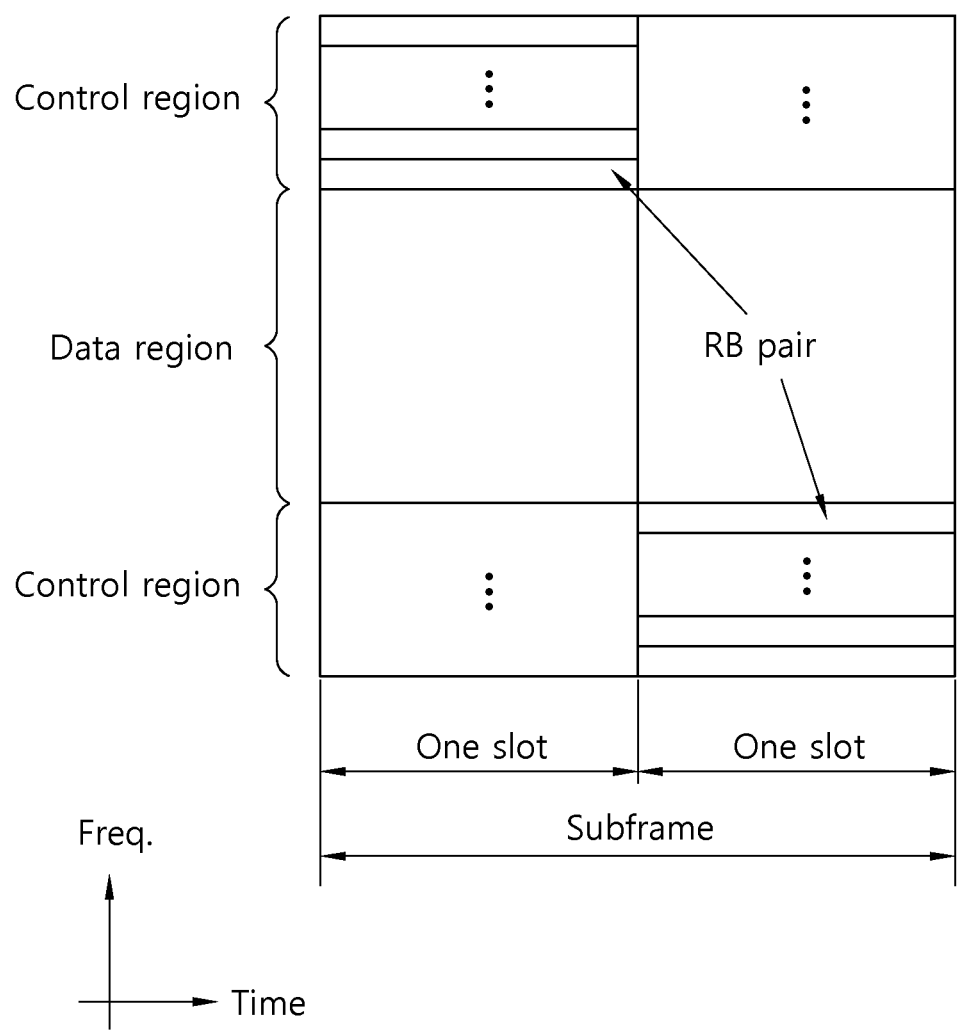
FIG. 5 shows the structure of an UL subframe.

FIG. 5 illustrates a structure of a uplink subframe.

With reference to FIG. 5, in the frequency domain, a uplink subframe can be divided into a control region where a Physical Uplink Control Channel (PUCCH) carrying uplink control information is allocated and a data region where a Physical Uplink Shared Channel (PUSCH) carrying user data and/or control information is allocated.

The PUCCH is allocated onto an RB pair in a subframe. RBs belonging to an RB pair occupy different sub-carriers in each of a first and a second slot.

<Hybrid Automatic Repeat Request (HARQ)>

HARQ operations can be classified into synchronous and asynchronous HARQ.

In a synchronous HARQ scheme, when an initial transmission fails, subsequent retransmission is carried out at a predetermined timing. The retransmission timing can be carried out at each $8^{th}$ time unit (subframe) after the initial transmission. Since that timing is already agreed upon between the base station and the UE, there is no need to additionally inform of the timing. If a data transmitter has received a NACK message, data can be retransmitted at each 8-th subframe until the data transmitter receives an ACK message.

On the other hand, the asynchronous HARQ scheme can be carried out as a retransmission timing is newly scheduled or through additional signaling. The timing of retransmission of the data that were once failed for transmission can be varied by various factors such as a channel condition.

Meanwhile, HARQ operations can be classified into channel non-adaptive HARQ and channel-adaptive HARQ. In the channel non-adaptive HARQ scheme, data modulation, the number of resource blocks, and coding method for retransmission are determined according to the configuration at the initial transmission. On the other hand, in the channel adaptive HARQ scheme, the configuration changes according to the channel condition. For example, suppose a transmitter has transmitted data by using 6 resource blocks at the initial transmission. Then the same number of resource blocks is used to retransmit the data in the channel non-adaptive HARQ scheme. However, in the case of the channel adaptive HARQ scheme, even with the same assumption that 6 resource blocks have been used for the initial data transmission, resource blocks of which the number is larger or smaller than 6 is used for data retransmission depending on the channel condition.

According to the classification above, four different combinations can be applied for HARQ operations; however, asynchronous and channel adaptive HARQ scheme; and synchronous and channel non-adaptive HARQ scheme are two commonly used schemes. The asynchronous and channel adaptive HARQ scheme can maximize retransmission efficiency by changing the amount of resources used and the retransmission timing adaptively according to the channel condition. However, the asynchronous and channel adaptive HARQ scheme readily increases the overhead, by which the scheme is usually not employed for uplink transmission. On the other hand, the synchronous and channel non-adaptive HARQ scheme predetermines retransmission timing and resource allocation, thus requiring virtually zero overhead; however, if the scheme is used in the channel condition exhibiting a severe change, the retransmission efficiency degrades considerably.

In the current 3GPP LTE system, asynchronous HARQ scheme is used for downlink transmission while synchronous HARQ scheme is used for uplink transmission. In other words, asynchronous HARQ scheme is used when the base station transmits/retransmits data while synchronous HARQ scheme is used when the UE transmits/retransmits data.

Figure 6:
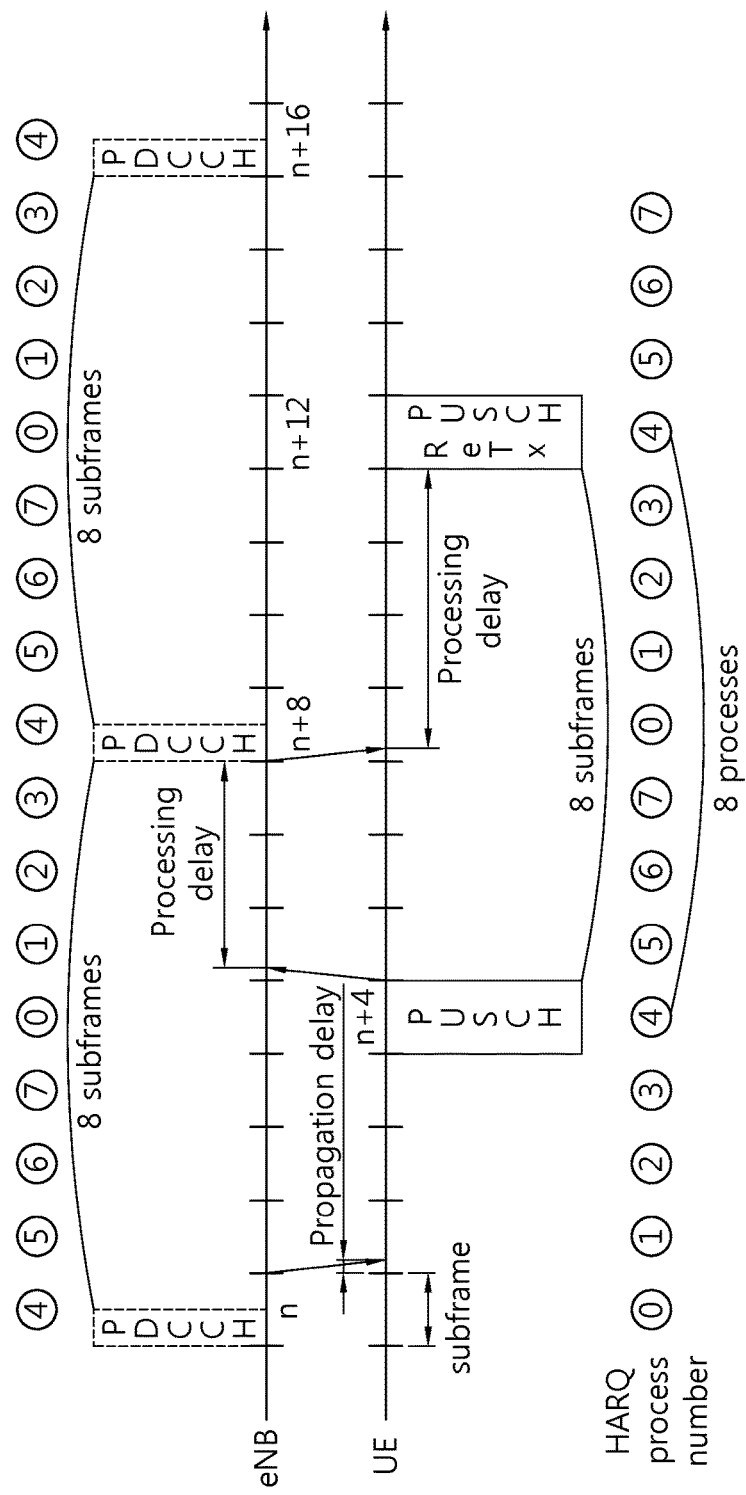
FIG. 6 illustrates a synchronous HARQ scheme used for uplink transmission.

FIG. 6 illustrates a synchronous HARQ scheme used for uplink transmission.

With reference to FIG. 6, after receiving a UL grant, which is scheduling information, at subframe n, the UE transmits the PUSCH at subframe n+4. It should be noted that the PUSCH is scheduled by the UL grant. At subframe n+8, the UE can receive the ACK/NACK signal related to the PUSCH through the PHICH or can receive the UL grant through the PDCCH. The UE can retransmit the PUSCH at subframe n+12. Subframe n, n+4, n+8, and n+12 are the subframes constituting the same HARQ process, and the same HARQ process number can be assigned to the subframes.

Meanwhile, as shown in FIG. 6, a time delay occurs until the UE transmits the next data after receiving the UL grant or the ACK/NACK signal from the base station. The time delay is generated due to a channel propagation delay and processing time required for data decoding and encoding. In order to prevent data transmission from being stopped during the time delay period, a method for transmitting data by using an independent HARQ process is being used.

For example, suppose the shortest time period from data transmission to the next data transmission is 8 subframes for one HARQ process. Then data transmission can be carried out without discontinuity by employing 8 independent HARQ processes. In the LTE FDD scheme, a maximum of 8 HARQ processes can be allocated in case the system is not based on the Multi Input Multi Output (MIMO) operation. In the LTE FDD scheme, the maximum number of HARQ processes can be varied according to UL-DL configuration, which will be described in detail later. In case two codewords are transmitted simultaneously based on the MIMO operation, the two codewords can be transmitted together through one HARQ process, or the two codewords can be transmitted separately by the respective HARQ processes.

Now, a carrier aggregation system will be described.

Figure 7:
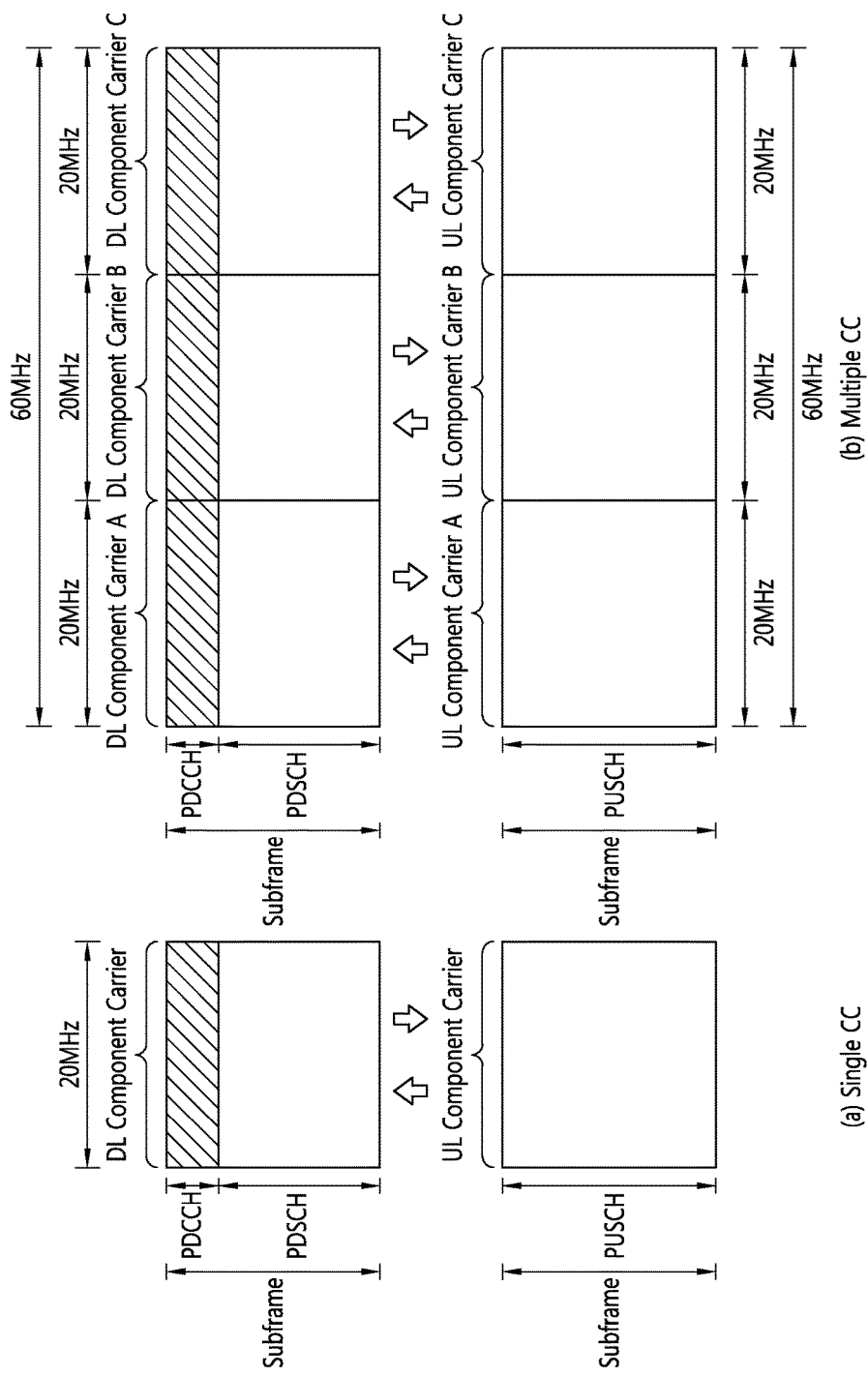
FIG. 7 is an example where a single component carrier system and a carrier aggregation system are compared with each other.

FIG. 7 is an example where a single component carrier system and a carrier aggregation system are compared with each other.

With reference to FIG. 7, in a single component carrier system, only one component carrier is allocated to the UE for uplink and downlink transmission. The bandwidth of a component carrier can vary, but only one component carrier is allocated to the UE. On the other hand, in a carrier aggregation (CA) system, a plurality of component carriers (DL CC A to C, UL CC A to C) can be allocated. For example, three component carriers of 20 MHz bandwidth can be allocated to the UE so that bandwidth of 60 MHz can be allocated.

Carrier aggregation systems can be classified into contiguous carrier aggregation systems where individual component carriers are disposed contiguously and non-contiguous carrier aggregation systems where individual component carriers are disposed apart from each other. In what follows, if a system is simply called a carrier aggregation system, it should be understood that the system refers to both of the case where component carriers are contiguous and the case where component carriers are non-contiguous.

When more than one component carrier is aggregated, target component carriers can use the same bandwidth employed by existing systems to ensure backward compatibility with the existing systems. For example, the 3GPP LTE system supports bandwidth of 1.4 MHz, 3 MHz, 5 MHz, 10 MHz, 15 MHz, and 20 MHz, while the 3GPP LTE-A system is capable of implementing broadband more than 20 MHz by using only the bandwidth of the 3GPP LTE system. Or a broadband system can be implemented by defining new bandwidth instead of adopting the bandwidth of existing systems directly.

System frequency band of a wireless communication system is differentiated by a plurality of carrier frequency. At this time, carrier frequency refers to the center frequency of a cell. In what follows, it is assumed that a cell can be composed of a pair of downlink frequency resources and uplink frequency resources. Or a cell can be composed only of downlink frequency resources. In general, if carrier aggregation is not taken into account, a single cell can always have uplink and downlink frequency resources in the form of a pair.

In order for packet data to be transmitted or received through a specific cell, the UE first needs to complete configuration of the specific cell. At this time, configuration refers to the state where system information required for transmitting and receiving data to and from the corresponding cell has been completed. For example, configuration can include the whole process of receiving common physical layer parameters required for data transmission and reception, MAC layer parameters, or parameters required for particular operations in the RRC layer. A cell which has completed configuration enters a state where the cell can immediately transmit and receive packets once information indicating that packet data can be transmitted is received.

A cell which has completed configuration can stay in the activation or deactivation state. At this time, activation refers to the state where data transmission or reception is being carried out or is in a ready state. The UE can monitor or receive the PDCCH and the PDSCH of an activated cell so that the UE can check the resources (which can be frequency or temporal resources) allocated to the UE.

Deactivation refers to the state where it is not possible to transmit or receive traffic data but measurement or transmission/reception of minimal information is allowed. The UE can receive system information (SI) required for receiving packets from a deactivated cell. On the other hand, the UE does not monitor or receive the PDCCH and the PDSCH of a deactivated cell to check the resources (which can be frequency or temporal resources) allocated to the UE.

Cells can be divided into primary cells (Pcells), secondary cells (Scells), and serving cells.

If the cell is configured for carrier aggregation, the UE establishes only one RRC connection to the network. During the RRC connection establishment/re-establishment/handover process, one cell provides Non-Access Stratum (NAS) mobility information and security input. Such a kind of cell is called a primary cell. In other words, a primary cell refers to the cell in which the UE carries out an initial connection establishment procedure or a connection re-establishment procedure or the cell specified as a primary cell during the handover procedure.

A secondary cell refers to the cell configured to provide additional radio resources after an RRC connection is established through a primary cell.

A serving cell refers to the cell configured to provide a service to the UE, and in case carrier aggregation is not configured or the UE is unable to provide carrier aggregation, the serving cell is composed of primary cells. In case carrier aggregation is configured, a plurality of serving cells can be employed. A plurality of serving cells can be formed by a set of one or more cells from among a primary cell or all of the secondary cells.

A Primary Component Carrier (PCC) refers to the CC corresponding to a primary cell. A PCC is such a kind of CC among various CCs, through which the UE establishes (RRC) connection to the base station during an initial phase. The PCC is a special CC which deals with establishing (RRC) connection for signaling of a plurality of CCs and manages UE context information which carries connection information related to the UE. Also, in case the PCC establishes connection to the UE and enters an RRC connected mode, the PCC always stays in the activation mode. A downlink component carrier corresponding to the primary cell is called a DownLink Primary Component Carrier (DL PCC), and a uplink component carrier corresponding to the primary cell is called a UpLink Primary Component Carrier (UL PCC).

A Secondary Component Carrier (SCC) refers to the CC corresponding to a secondary cell. In other words, an SCC is allocated to the UE in addition to a PCC; an SCC is an extended carrier for allocation of additional resources in addition to a PCC and can be in the activation or the deactivation mode. A downlink component carrier corresponding to a secondary cell is called a DL Secondary CC (DL SCC), and a uplink component carrier corresponding to a secondary cell is called a UL SCC.

As for component carriers constituting a serving cell, a downlink component carrier may constitute one serving cell, and a downlink component carrier and a uplink component carrier may be configured to be connected to each other to form one serving cell. In the prior art, a serving cell is not allowed to be formed by only one uplink component carrier. However, the present invention allows a serving cell to be formed by using only an uplink component carrier.

Activation/deactivation of a component carrier is equivalent to the concept of activation/deactivation of a serving cell. For example, suppose a serving cell 1 is composed of a DL CC1. Then activation of the serving cell 1 indicates activation of the DL CC1. Now, suppose a serving cell 2 is configured so that connection is established between a DL CC2 and a UL CC2. Then activation of the serving cell 2 indicates activation of the DL CC2 and the UL CC2. In this sense, each component carrier can correspond to a cell.

The number of component carriers aggregated can be set differently for downlink and uplink. The case where the number of downlink CCs is the same as the number of uplink CCs is called symmetric aggregation, while it is called asymmetric aggregation if the numbers are different. Similarly, sizes of CCs (namely, bandwidth) can be different from each other. For example, if 5 CCs are used to form bandwidth of 70 MHz, the bandwidth may be realized by 5 MHz CC (carrier #0), 20 MHz CC (carrier #1), 20 MHz CC (carrier #2), 20 MHz CC (carrier #3), and 5 MHz CC (carrier #4).

As described above, different from single component carrier systems, a carrier aggregation system can support a plurality of serving cells, namely, a plurality of component carriers (CCs).

Meanwhile, a carrier aggregation system can support Cross-Carrier Scheduling (CCS). CCS is such a scheduling method capable of resource allocation of the PDSCH transmitted through another component carrier by using the PDCCH transmitted through a particular component carrier and/or resource allocation of the PUSCH transmitted through another component carrier in addition to a component carrier linked to the particular component carrier by default. In other words, the PDCCH and the PDSCH can be transmitted through different DL CCs, and the PUSCH can be transmitted through a UL CC which is not linked to the DL CC through which the PDCCH including a UL grant has been transmitted, namely, a UL CC belonging to a different cell other than the UL CC constituting the same cell. As described above, a CCS-supporting system needs a carrier indicator that can be used to indicate which PDSCH/PUSCH transmitted through some DL CC/UL CC is being scheduled by the PDCCH. The field including such a carrier indicator is called a Carrier Indication Field (CIF).

A CCS-supporting system can include the CIF in the existing Downlink Control Information (DCI) format. In the CCS-supporting system, for example, in the LTE-A system, the CIF is added to an existing DCI format (namely, the DCI format used in the LTE system); therefore, 3 bits can be extended, and the PDCCH structure can re-use the coding method, the resource allocation method (in other words, resource mapping based on the CCE), and so on used in the existing system.

The base station can configure a set of PDCCH monitoring DL CCs (monitoring CCs). The set of PDCCH monitoring DL CCs comprises part of the whole DL CCs aggregated, and if CCS is determined, the UE carries out PDCCH monitoring/decoding only for the DL CCs included in the set of PDCCH monitoring DL CCs. In other words, only through the DL CC included in the set of PDCCH monitoring DL CCs, does the base station transmits the PDCCH related to the PDSCH/PUSCH to be scheduled. The set of PDCCH monitoring DL CCs can be configured in a UE-specific manner, in a UE group-specific manner, or in a cell-specific manner.

Non-Cross Carrier Scheduling (NCCS) refers to the scheme where scheduling is carried out within the same carrier (cell) and data are received/transmitted according to the scheduling. The NCCS is also called self-scheduling. The NCCS can be regarded as a scheduling method that has been applied to existing UEs for which only a single cell is established.

In what follows, MBMS and Multicast/Broadcast Single Frequency Network (MBSFN) will be described.

An MBSFN synchronization area refers to a network area in which all of base stations are synchronized and MBSFN transmission is carried out. An MBSFN synchronization area can support one or more MBSFN areas. For one particular frequency layer, one base station can belong to only one MBSFN synchronization area. An MBSFN synchronization area is independent of an MBMS service area.

MBSFN transmission or transmission in the MBSFN mode refers to a simultaneous transmission technique by which the same signal is transmitted at the same time in a plurality of cells. MBSFN transmission from a plurality of cells belonging to the MBSFN area is viewed as single transmission to a UE.

An MBSFN area comprises a group of cells within the MBSFN synchronization area of a network, and the cells cooperate with each other to carry out MBSFN transmission. Except for MBSFN area reserved cells, all of the cells within the MBSFN area contribute to MBSFN transmission and advertise their capability. For the case of a UE, only part of the allocated MBSFN area may be taken into consideration. An MBSFN area reserved cell refers to the cell which does not contribute to MBSFN transmission within the MBSFN area or a cell allowed to provide a different service but with limited transmission power utilizing resources for MBSFN transmission.

Figure 8:
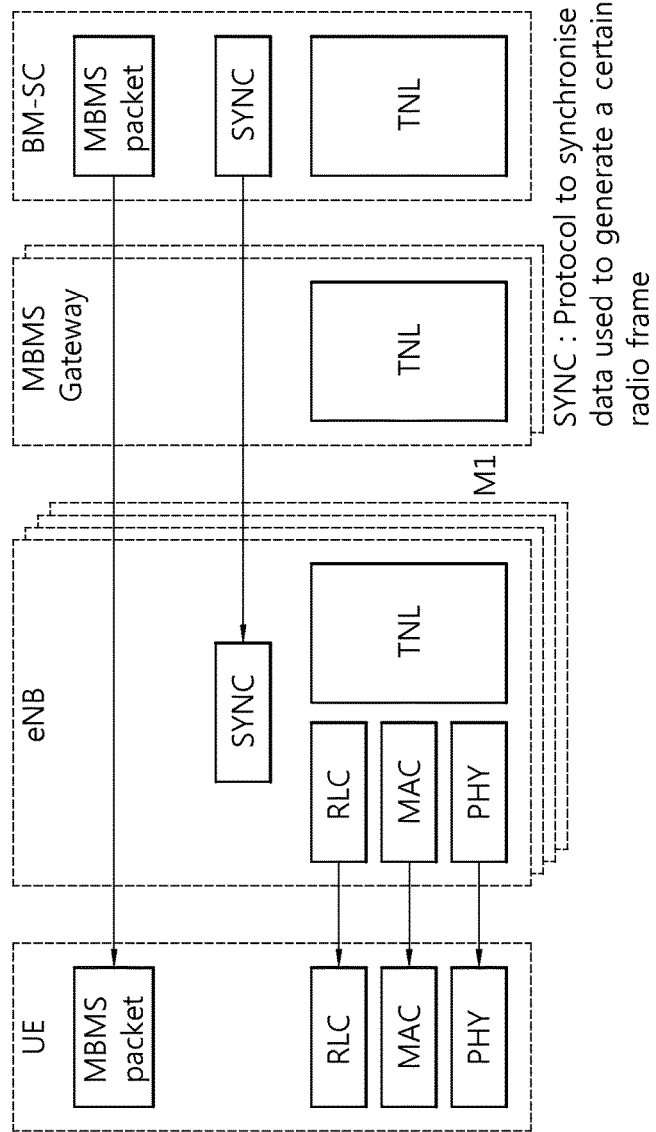
FIG. 8 illustrates a user plane structure for supporting Multimedia Broadcast Multicast Services (MBMS)
Figure 9:
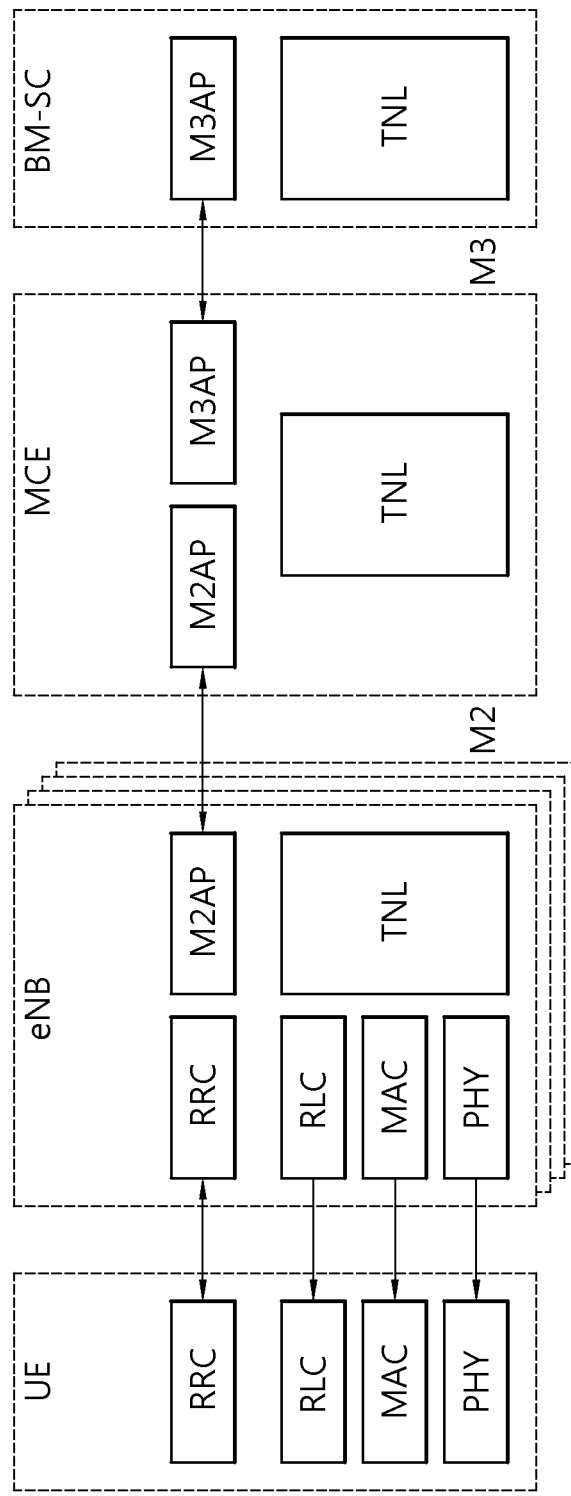
FIG. 9 illustrates a control plane structure for supporting MBMS.

FIG. 8 illustrates a user plane structure for supporting Multimedia Broadcast Multicast Services (MBMS), and FIG. 9 illustrates a control plane structure for supporting MBMS.

A UE should be able to receive MBMS in the RRC_IDLE and RRC_CONNECTED state.

In the RRC_IDLE state, the UE can carry out the operation as described below.

1. UE-specific DRX can be set by an upper layer. 2. The UE monitors a paging channel to detect a call, system information change, ETWS notification, etc. and carries out neighboring cell measurement and cell selection (reselection). The UE can obtain system information and carry out measurement.

In the RRC_CONNECTED state, the UE can deliver data, and UE-specific DRX can be set in a lower layer. A CA-supporting UE can use one or more secondary cells along with the primary cell.

The UE monitors a paging channel and monitors System Information Block (SIB) type 1 content to detect a system information change. The UE monitors control channels related to a shared data channel to determine whether data have been scheduled for the UE. Also, the UE provides channel quality and feedback information. The UE is capable of measuring neighboring cells and reporting the measurement result and obtains system information.

MCCH, the logical channel where control information of MBMS is transmitted, has the following features.

One MBSFN area is related to one MCCH, and one MCCH corresponds to one MBSFN area. An MCCH is transmitted through a Multicast Channel (MCH). The MCCH includes one MBSFN area configuration RRC message and retains a list of all of the MBMS services.

An MCCH is transmitted from all of the cells within the MBSFN area except for the MBSFN area reserved cell. The MCCH is RRC transmitted at each MCCH repetition period. The MCCH uses a modification period.

A notification mechanism is used to notify of the MCCH session start or modification of the MCCH due to presence of an MBMS counting request message.

The UE utilizes MCCH monitoring at modification periods for detecting those MCCH modifications notified without using the notification mechanism.

Figure 10:
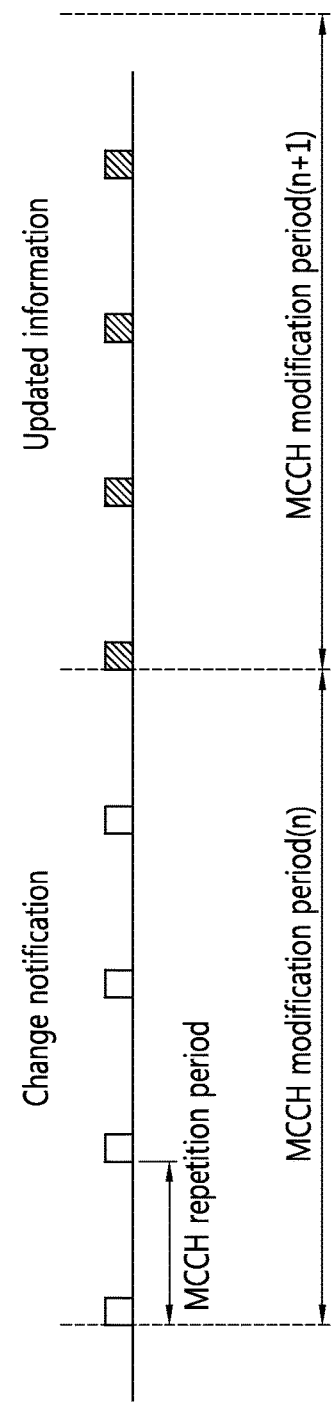
FIG. 10 illustrates a process of transmitting MCCH information to a UE when the MCCH information has been modified.

FIG. 10 illustrates a process of transmitting MCCH information to a UE when the MCCH information has been modified.

Modification of MCCH information occurs only at a specific radio frame. Within a modification period, the same MCCH information is transmitted repeatedly with a repetition period.

To notify the UE in the RRC_IDLE or RRC_CONNECTED state of modification of MCCH information, a PDCCH which uses an MBMS-specific RNTI (M-RNTI) can be used.

Notification of modification of MCCH information can be transmitted periodically through the PDCCH, where the notification can be transmitted only from the MBSFN subframe. The MCCH information acquisition process can be carried out only by a MBMS-supporting UE in the RRC_IDLE or RRC_CONNECTED state.

Figure 11:
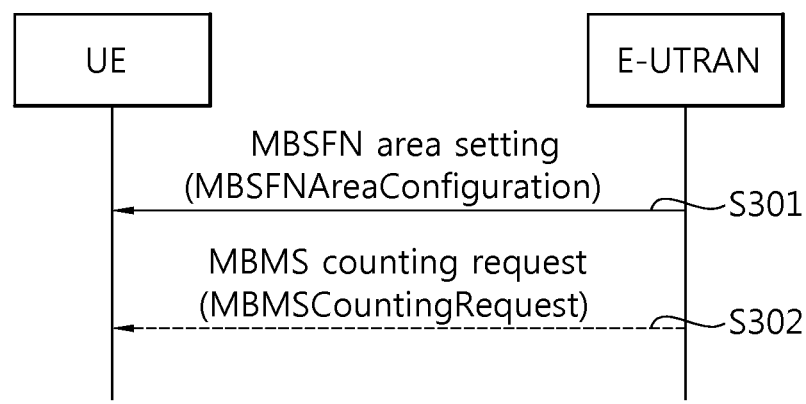
FIG. 11 illustrates an MCCH information delivery process.

FIG. 11 illustrates an MCCH information delivery process.

The E-UTRAN transmits 'MBSFNAreaConfiguration' message to the UE S301.

The E-UTRAN transmits 'MBMSCountingRequest' message to the UE S302.

The table below is an example of system information that the UE has to receive with respect to the MBMS.

TABLE 2

```
SystemInformationBlockType13-r9 ::=   SEQUENCE {
      mbsfn-AreaInfoList-r9              MBSFN-AreaInfoList-r9,
      notificationConfig-r9              MBMS-NotificationConfig-r9,
      lateNonCriticalExtension                OCTET STRING
                                OPTIONAL,  -- Need OP
      ...
}
```

TABLE 3

```
SystemInformationBlockType15-r11 ::=    SEQUENCE {
      sai-IntraFreq-r11    MBMS-SAI-List-r11          OPTIONAL,  -- Need OR
      sai-InterFreqList-r11   MBMS-SAI-InterFreqList-r11   OPTIONAL,  -- Need OR
      lateNonCriticalExtension   OCTET STRING  OPTIONAL, -- Need OP
      ...
}
MBMS-SAI-List-r11 ::=SEQUENCE (SIZE (1..maxSAI-MBMS-r11)) OF MBMS-SAI-r11
MBMS-SAI-r11::=          INTEGER (0..65535)
MBMS-SAI-InterFreqList-r11 ::=      SEQUENCE (SIZE (1..maxFreq)) OF MBMS-SAI-InterFreq-r11
MBMS-SAI-InterFreq-r11 ::=SEQUENCE {
      dl-CarrierFreq                ARFCN-ValueEUTRA,
      sai-List-r11                     MBMS-SAI-List-r11,
      ...
}
```

In the table above, 'sai-IntraFreq' includes a list of MBMS SAIs with respect to the current frequency. 'sai-IntraFreqList' includes a list of neighboring frequencies providing MBMS services and the corresponding MBMS SAIs. 'sai-List' includes a list of MBMS SAIs with respect to a particular frequency.

In what follows, the present invention will be described.

A system supporting the LTE release 8/9/10 standard transmits reference signals and control channels through downlink carriers. For example, a Cell-specific RS (CRS), Primary Synchronization Signal (PSS)/Secondary Synchronization Signal (SSS), Physical Downlink Control Channel (PDCCH), and Physical Broadcast Channel (PBCH) are transmitted.

In a future wireless communication system, a new type of carrier may be introduced, which transmits only part or none of the aforementioned reference signals and control channels. This feature is intended to improve an interference problem among a plurality of cells and to improve scalability among carriers. A new carrier of the feature above is called an extension carrier or a New Carrier Type (NCT).

In the prior art, the MBMS is specified based on the channel structure and reference signal transmission with respect to existing carriers. However, since a channel structure and reference signal transmission different from the existing carriers can be used for the NCT, it may be difficult to apply the existing MBMS method to the NCT in the same manner.

In what follows, a method for an NCT to support a Multimedia Broadcast/Multicast Service (MBMS) will be described.

MBSFN transmission is used to support MBMS. MBSFN transmission refers to multiple cells' participating in transmission at the same time and multicasting or broadcasting the same signal. By using MBSFN transmission, reception efficiency of a UE can be improved.

In case a UE receives signals according to MBSFN transmission, since signals transmitted from a plurality of cells are combined together, the transmission and reception range of a signal transmitted from a neighboring cell is extended. Therefore, MBSFN transmission uses the extended CP which is longer than the commonly used normal CP.

Figure 12:
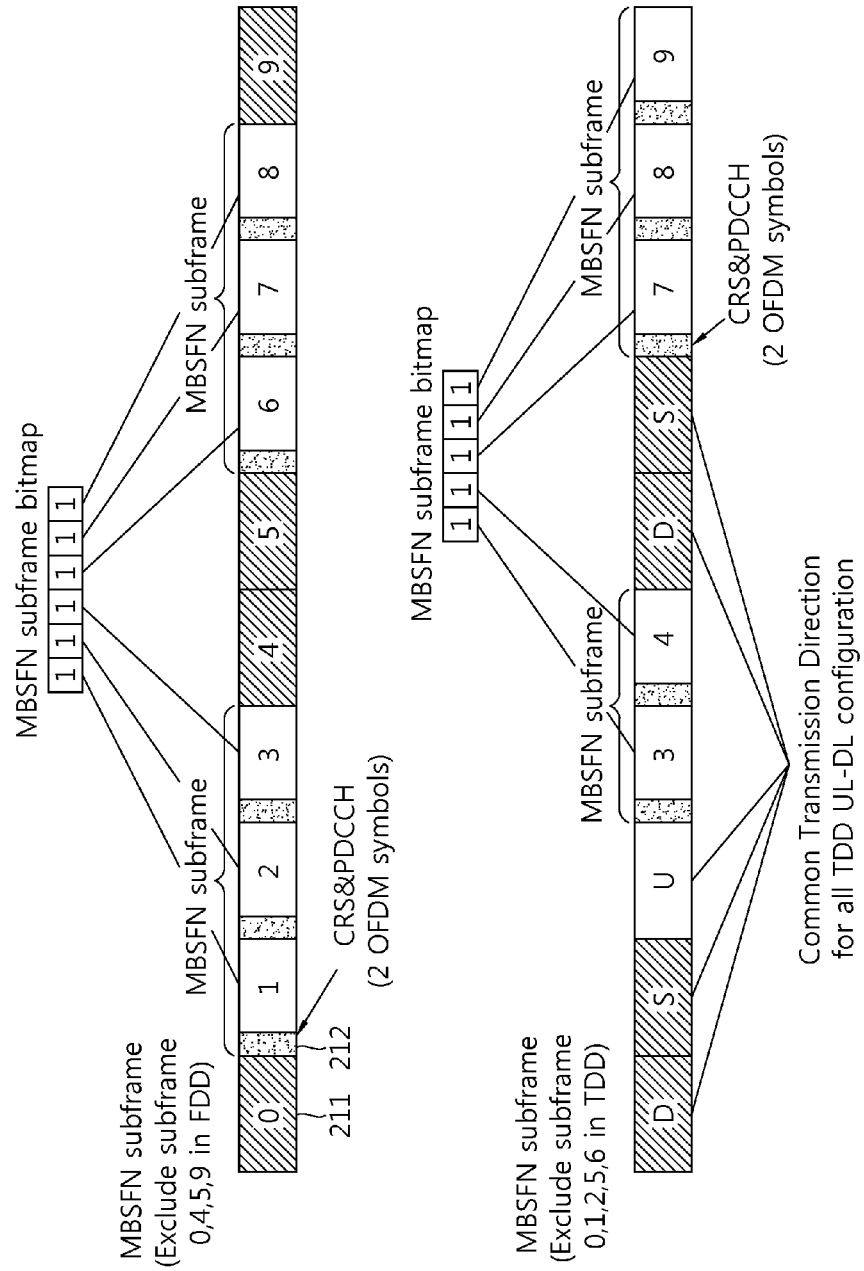
FIG. 12 illustrates a structure of an MBSFN subframe.

FIG. 12 illustrates a structure of an MBSFN subframe.

With reference to FIG. 12, MBSFN transmission is configured in units of subframes. A subframe configured to carry out MBSFN transmission is called an MBSFN subframe. In a subframe configured as an MBSFN subframe, MBSFN transmission is carried out by those OFDM symbols except for the initial two OFDM symbols for PDCCH transmission. Suppose the area used for MBSFN transmission is an MBSFN area for the convenience of description. Then a CRS for unicasting is not transmitted in the MBSFN area, but an MBMS-dedicated RS common to all of the cells participating in the transmission is used.

To inform the UE which does not receive an MBMS of the fact that a CRS is not transmitted in the MBSFN area, configuration information of an MBSFN subframe is broadcast by being incorporated into the system information of a cell.

Since most UEs use a CRS to carry out Radio Resource Management (RRM), handling of a Radio Link Failure (RLF), and synchronization, it is important to inform of absence of a CRS in a particular area.

A CRS is transmitted to the initial two OFDM symbols used as a PDCCH in the MBSFN subframe, where in this case, the CRS is not intended to be used by the MBSFN. In the initial two OFDM symbols used as a PDCCH in the MBSFN subframe, a transmitted CRS (namely, whether the CRS uses a normal CP or an extended CP) uses the CP for a normal subframe, namely, the CP applied to those subframes other than the MBSFN subframe. For example, in case a normal subframe 211 uses a normal CP, a CRS according to a normal CP is also used for the initial two OFDM symbols 212 of the MBSFN subframe.

Meanwhile, a subframe which can be configured as an MBSFN subframe is specified separately for the FDD and TDD scheme, and a bitmap can be used to determine whether a subframe is an MBSFN subframe. In other words, if a bit of the bitmap corresponding to a particular subframe is 1, the particular subframe can be regarded as being configured as an MBSFN subframe.

Meanwhile, in the case of CRS-based unicasting, increase of interference among cells can be a problem. To avoid increase of interference, UE-specific RS (URS) based unicasting has been introduced. In the case of URS-based unicasting, since a CRS is not used for demodulation, it is efficient to employ URS-based unicasting for those subframes which do not have a CRS.

The whole or part of the MBSFN subframe can be used as a subframe intended for unicasting rather than the MBMS transmission. Since this subframe does not participate in the MBMS but used for unicasting, the subframe is called a fake MBSFN subframe. The subframe participating in an actual MBMS and being used for MBSFN transmission is called a real MBSFN subframe.

Since the fake MBSFN subframe is used for unicasting, the CP applied for a normal subframe is used in the same way for the whole of the fake MBSFN subframe. In other words, the fake MBSFN subframe directly uses the CP configured according to the coverage of a serving cell.

In the case of NCT, a CRS may not be set for a subframe. Therefore, it is not necessary to apply the fake MBSFN subframe to use the URS. In other words, in the case of NCT, there is no need to set the MBSFN subframe separately as a fake MBSFN subframe.

On the other hand, it is necessary to configure an extended CP for a real MBSFN subframe to provide a real MBMS. Therefore, in the case of NCT, configuration for an MBSFN subframe only has to be carried out for a real MBSFN subframe only.

Figure 13:
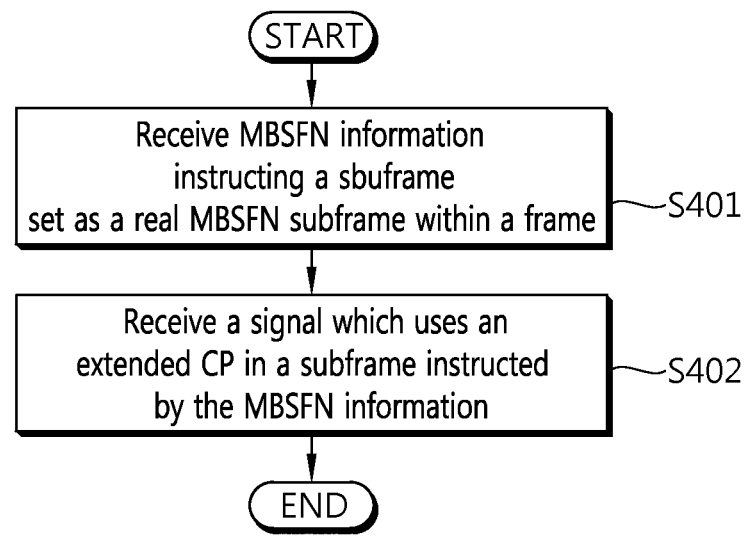
FIG. 13 illustrates a method for instructing an MBSFN subframe according to one embodiment of the present invention.

FIG. 13 illustrates a method for instructing an MBSFN subframe according to one embodiment of the present invention.

With reference to FIG. 13, the UE receives MBSFN information which instructs (indicates) a subframe which is configured as a real MBSFN subframe within a frame S401. The MBSFN information can be broadcast through system information. The MBSFN information may be transmitted as a UE-specific upper layer signal such as an RRC message. The MBSFN information can be provided in the form of a bitmap.

The UE receives a signal which uses an extended CP in the subframe instructed by the MBSFN information S402.

In an existing method, a carrier used the MBSFN subframe bitmap to instruct a subframe which does not have a CRS; in the present invention, the MBSFN information can be used to inform of the subframe of an NCT to which an extended CP is applied in a NCT.

Therefore, according to the present invention, in case a normal subframe (a subframe other than the MBSFN subframe) uses an extended CP, MBMS transmission can be carried out without setting a real MBSFN subframe according to the MBSFN information. In the case of a subframe configured as a real MBSFN subframe, the subframe can always be made to be recognized as a subframe to which an extended CP is applied.

Also, in the case of a carrier of the prior art, the MBSFN subframe bitmap has been used to instruct a real MBSFN subframe and a fake MBSFN subframe, the MBSFN subframe bitmap according to the present invention is used to instruct only the real MBSFN subframe in an NCT.

In the case of a UE which does not receive an MBMS service, the UE can know from MBSFN information which subframe has to use the extended CP and which subframe has to use a normal CP. In case the NCT does not use the PDCCH, an EPDCCH may have to be used instead. In this case, a Physical Multicast Channel (PMCH) and the EPDCCH can be frequency division multiplexed. At this time, since even an UE which does not receive an MBMS service can know from the MBSFN information which CP is used for each subframe, the EPDCCH can be decoded in a proper manner. Since the PDCCH in a conventional method is time division multiplexed with the PMCH, it was not necessary to know t the CP type of the PMCH.

Meanwhile, there are times when a normal CP subframe and an extended CP subframe coexist in a cell, and the UE may have to use the normal CP and the extended CP interchangeably for each subframe.

Figure 14:
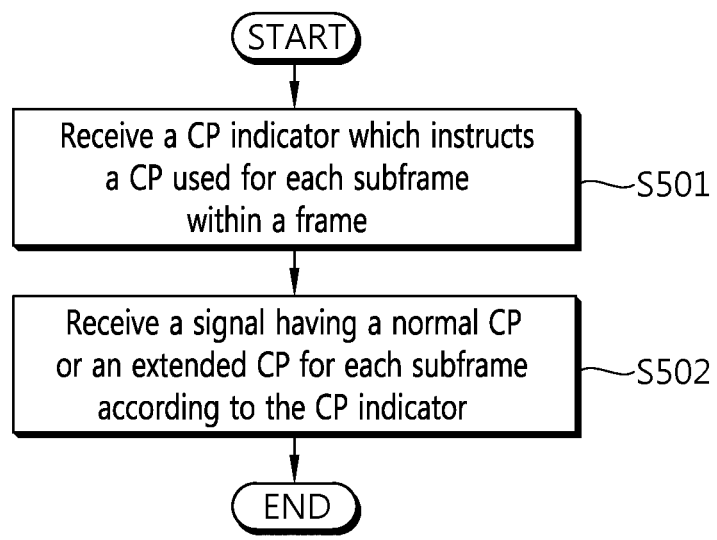
FIG. 14 illustrates a CP signaling method according to another embodiment of the present invention.

FIG. 14 illustrates a CP signaling method according to another embodiment of the present invention.

With reference to FIG. 14, the UE receives a CP indicator which indicates a CP used for each subframe within a frame S501. In other words, the base station can directly instruct which of the normal CP and the extended CP has to be used for each subframe, which can be called a CP indicator. In the same way as a real MBSFN subframe is instructed, the CP indicator can be realized by a bitmap. The CP indicator should preferably be broadcast, can be transmitted to an MIB or an SIB, or can be transmitted to a scrambling DCI as a common RNTI by including the corresponding configuration.

The UE receives a signal having a normal CP or an extended CP for each subframe according to the CP indicator S502.

Signaling of a CP indicator can be configured only for a subframe to which the CP can be applied in a flexible manner. In other words, particular subframes can be excluded from the signaling target of the CP indicator. Excluded subframes may include a subframe to which a Tracking RS (TRS) is always transmitted, a subframe to which a broadcast channel such as the PBCH is transmitted, a subframe to which a synchronization signal such as PSS/SSS is transmitted, and a subframe to which a discovery signal is transmitted. Excluded subframes may further include a subframe which is not the target of the MBSFN subframe.

In the case of a real MBSFN subframe, it may be assumed that an MBMS-dedicated RS is always transmitted. In case an RB belonging to one frequency band within the real MBSFN subframe is used for unicasting and transmitted being multiplexed with the MBMS-dedicated RB, the REs of the RB to which the MBMS-dedicated RS belongs can be punctured or rate-matched.

In case the UE does not use the method for using a signal instructing a subframe which uses the extended CP, the UE may carry out blind decoding using a normal CP and an extended CR And this can be made to be carried out only for a particular subframe (e.g., MBSFN subframe).

Whether to use an extended CP in the PMCH can be determined in an extended manner similarly to the case where a Positioning RS (PRS) is transmitted to the NCT.

In the case of an existing PDCCH, the PDCCH is composed so that it can be time division multimplexed with the PMCH or PRS. However, the EPDCCH is composed so that it can be frequency division multiplexed with the PMCH or PRS. Therefore, the EPDCCH, PMCH, and PRS can be received simultaneously through one FFT (Fast Fourier Transform) operation only when their CP lengths are adjusted to be the same to each other. If the CP lengths of the EPDCCH, PMCH, and PRS are different from each other, FFT operation and subsequent decoding have to be performed on the CPs separately, thereby increasing complexity of the UE.

A carrier of the prior art transmits a PRS for positioning of the UE based on Observed Time Difference Of Arrival (OTDOA), and a PRS transmission subframe is set for this purpose.

According to the setting of the PRS transmission subframe, the CP of the PRES can be determined as follows. 1) The PRS setting of the MBSFN and normal subframe is determined according to the CP of the subframe 0 (the initial subframe within the frame). In case the CP of the PDSCH and that of the PRS in a normal subframe coincide with each other, the UE can receive the schedule of the PDSCH in the PRS transmission subframe.

2) PRS setting of the MBSFN subframe is determined by the extended CP. Since transmission of the PRS is carried out in a plurality of cells, the CP of the PRS is made to coincide with the extended CP even if the CPs of normal frames among cells are different from each other so that a PRS between different cells can be multiplexed within one subframe.

Meanwhile, since the CRS may not be transmitted at all in the case of NCT, it may not be required to indicate existence of the CRS with respect to each subframe. Therefore, setting of a real MBSFN subframe according to MBSFN information is useful for instructing the extended CP, which can be used to instruct the extended CP subframe only for a specific subframe in a cell where a normal CP is used in a normal subframe (for example, subframe 0). The MBSFN subframe can be set along with the PRS transmission subframe, and the PRS transmission in the subframe instructed by the extended CP subframe is carried out through the extended CP. To carry out the operation above, the MBSFN subframe can always be used as the extended CP, or in case a normal CP subframe and an extended CP subframe coexist in the same cell and the UE needs to operate the normal CP and the extended CP together for each subframe (for example, NCT), the normal CP and the extended CP can be instructed directly for each subframe.

The UE receiving a PRS can apply the following rules.

1. In case the UE instructs an extended CP by using MBSFN subframe signaling such as the MBSFN information or directly instructs a CP for each subframe by using a CP indicator, the method for determining a CP with respect to a PRS for the carrier of the prior art is not applied to the NCT.

In the case of an NCT, the PRS uses the CP instructed by the information such as MBSFN information or the CP indicator. However, in case a PRS subframe is doubly set as a subframe configured by a normal CP and as a subframe configured by an extended CP, the UE may recognize the double setting as occurrence of an error (namely, a PRS subframe should be configured as a subset of one of a set of normal CP subframes and a set of extended CP subframes) or follow the CP instructed for each subframe. In other words, for each subframe, PRS reception can be carried out respectively for a normal CP and an extended CP. Similarly, only one from the normal and the extended CP can be applied to the PRS reception. For example, the UE can apply the CP instructed by the PRS-related configuration set by an RRC message with respect to the corresponding serving cell.

2. The method for determining a PRS CP for a carrier of the prior art can also be applied to the NCT. The UE can apply the CP instructed by the PRS-related configuration (the configuration corresponding to a serving cell between 'OTDOA-ReferenceCellInfo' and 'OTDOA-NeighbourCellInforList') set by an RRC message with respect to the corresponding serving cell.

In the case of an NCT, if a subframe receiving the EPDCCH (in what follows, it is called an EPDCCH subframe) and a subframe receiving a PRS (in what follows, a PRS subframe) collide with each other, the UE receiving the PRS can carry out the operation below.

1. In a colliding subframe, the UE can receive the PRS and EPDCCH based on the assumption that the CP of the EPDCCH (or PDSCH in the case of multiplexing) is determined in the same way according to the CP of the PRS subframe.

2. In the colliding subframe, the UE can receive the PRS and EPDCCH on the assumption that the CP of the PRS is determined in the same way according to the CP of the EPDCCH subframe.

3. In case CP configuration of the PRS subframe differs from that of the EPDCCH subframe, the UE may block receiving the EPDCCH or fail to receive a UL grant or ACK/NACK. In this case (which includes the case where the UE fails to receive the EPDCCH as the CP configuration of the MBSFN subframe differs from that of the EPDCCH subframe or the EPDCCH is not multiplexed to the subframe used for the MBMS), 1) the PDSCH related to the corresponding DL subframe (namely, the channel in which a synchronous HARQ process is being carried out) recognizes the UL grant/PHICH as NACK and can carry out re-transmission (since PUSCH scheduling cannot be applied to the corresponding UL subframe in the case of Non-Cross Carrier Scheduling (NCCS), the UE makes the PUSCH be re-transmitted to the corresponding UL subframe).

2) The PUSCH related to the corresponding DL subframe (namely, the channel in which a synchronous HARQ process is being carried out) recognizes the UL grant/PHICH as ACK and can put off transmission (since PUSCH scheduling can be applied to the corresponding UL subframe in the case of CCS, the corresponding UL subframe can be allocated to the UE to which the CCS is applied).

The two methods 1) and 2) can be set according to CCS and NCCS load.

Or CCS can be made to be applied only to the corresponding DL subframe.

4. The CP configuration of the EPCCH in one cell can always be set in the same way as for the CP configuration of the PRS. In other words, the UE recognizes different CP configuration as occurrence of an error and may not carry out receiving the PRS.

5. To avoid collision between CP configuration of the EPDCCH and CP configuration of the PRS, the NCT can be configured so that it does not transmit the PRS.

<Gap Setting at the Time of CP Switching>

Meanwhile, for some of the methods above, the UE may switch to receiving of an extended CP from receiving of a normal CP while receiving consecutive subframes or switch to receiving of a normal CP from receiving of an extended CP. For switching of CPs as described above, a gap interval can be used at the time of switching CP lengths.

For example, at the time of CP switching, one or part of OFDM symbols are set as a gap and left unoccupied. This operation may be carried out only for switching from a normal CP to an extended CP or only for switching from an extended CP to a normal CR A gap can be applied to the first or the last OFDM symbol of a subframe.

The following descriptions are based on the assumption that in an NCT, an EPDCCH subframe collides with a PRS subframe with respect to a UE receiving a PRS.

<Priority at the Time of Resource Collision Among PRS, PMCH, EPHICH, EPDCCH, and PDSCH>

In the case of an NCT, the PDCCH may not be used. If this is the case, frequency division multiplexing of PMCH, EPDCCH, EPHICH, and PDSCH, namely, multiplexing in the frequency domain may be required within one subframe.

Also, in case the CP length of a PRS subframe is different from that of a normal subframe, frequency division multiplexing of the EPDCCH, PHICH, and PSCH may also be required. In this case, since the PRS is set in a cell-specific manner, the UE can use one of the following methods if the PDSCH collides with a resource block.

1) It is assumed or understood that the EPHICH and PDSCH are not mapped to the corresponding RB.

2) The PRS transmission RE of the corresponding RB can carry out puncturing on the RE of the PDSCH (it should be noted that in case PDSCH demodulation based on DMRS is set, a fallback to demodulation by using CRS or TRS may be taken into consideration).

3) The corresponding RB allocation can be regarded as occurrence of an error.

Frequency division multiplexing of the PMCH, EPDCCH, PHICH, and PDSCH may be required. In this case, since transmission of the PMCH is set in a cell-specific manner, the UE can use one of the following methods when the PDSCH collides with an RB.

1) It is assumed or understood that the EPHICH and PDSCH are not mapped to the corresponding RB.

2) The RS transmission RE dedicated to the PMCH of the corresponding RB can carry out puncturing on the RE of the PDSCH (it should be noted that in case PDSCH demodulation based on DMRS is set, a fallback to demodulation by using CRS or TRS may be taken into consideration).

3) The corresponding RB allocation can be regarded as occurrence of an error.

Frequency division multiplexing of the PRS and PMCH can be taken into consideration. In this case, transmission of the PRS may use an extended CP with respect to the PMCH (at the corresponding subframe), or frequency domain multiplexing with the PMCH can be allowed only when the PRS transmission is set by the extended CP. At the time of frequency division multiplexing, in case the transmission area of the PMCH collides with that of the PRS, one of the following methods can be used.

1) It is recognized that the PMCH is transmitted to the corresponding RB, but the PRS is not. 2) It is recognized that the PRS is transmitted to the corresponding RB, but the PMCH is not. 3) The corresponding setting is regarded as occurrence of an error, and only the PMCH can be received. Or 4) the corresponding setting is regarded as occurrence of an error, and only the PRS may be received.

Among the methods above, transmission of the PRS and/or PMCH may not be recognized for the case of a UE which does not receive the corresponding service. Therefore, an area to which the PRS or PMCH may be set is configured to be blocked beforehand, and in case resource allocation of the PDSCH, EPDCCH, and EPHICH is overlapped in the corresponding area, the corresponding resources can be punctured or made not to use a search space allocated to the corresponding resources.

<PRS Pattern in the NCT>

In a carrier of the prior art, to prevent a CRS from colliding with a PRS, the PRS is not mapped (when an RS is mapped diagonally at each slot, mapping to the corresponding OFDM symbol is excluded) to the OFDM symbol to which the PDCCH is transmitted (for example, OFDM symbol 0, 1, 2) and to the OFDM symbol to which the CRS is transmitted (which varies according to whether an extended CP is used and the number of ports).

Figure 15:
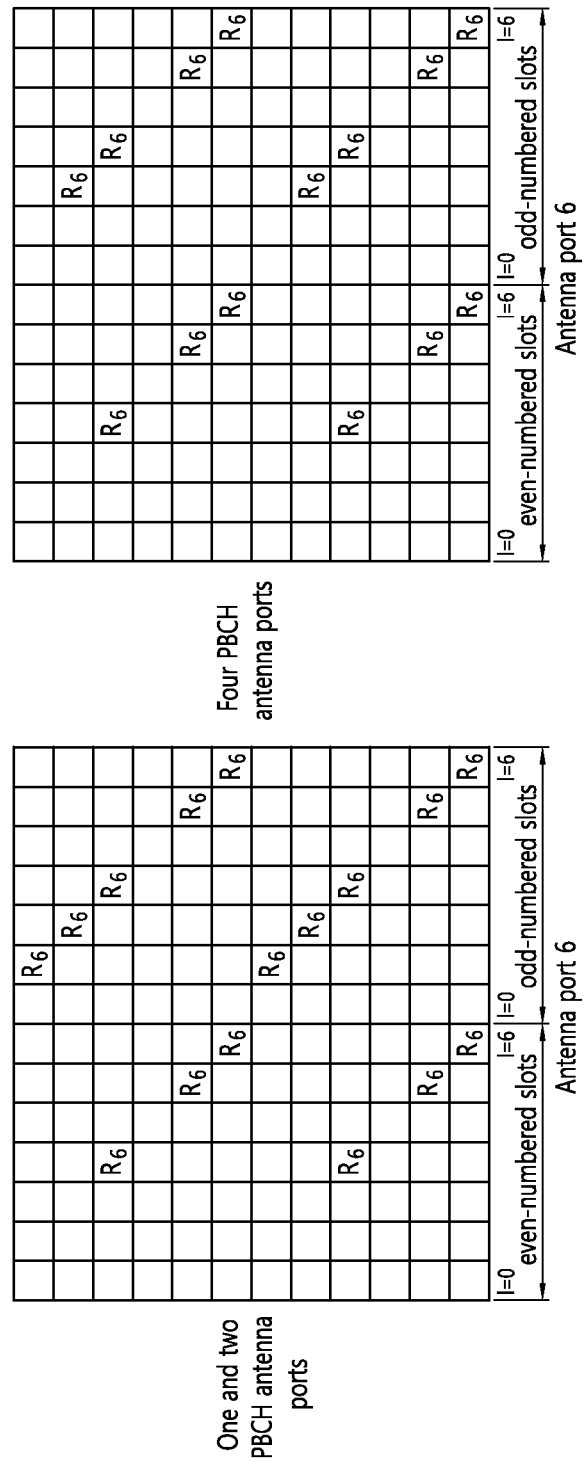
FIG. 15 illustrates an example of mapping of a PRS in a normal CP.

FIG. 15 illustrates an example of mapping of a PRS in a normal CP.

In a normal CP, the PRS transmitted through an antenna port 6 is not mapped to the OFDM symbol 0, 1, and 3 to which the PDCCH can be mapped. Also, the PRS is not mapped to the OFDM symbol to which the CRS can be transmitted. In one OFDM symbol, two REs are allocated for a PRS. The two REs are spaced 6 sub-carriers apart from each other along the frequency axis (like 1, 7).

Figure 16:
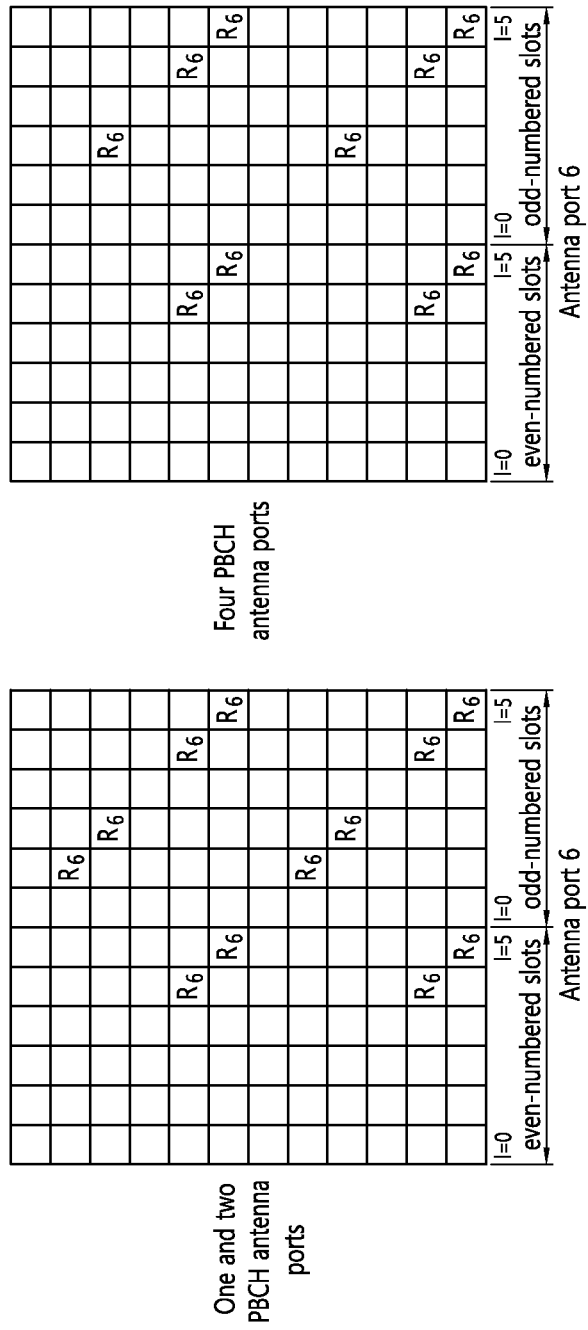
FIG. 16 illustrates an example of mapping a PRS in an extended CP.

FIG. 16 illustrates an example of mapping a PRS in an extended CP.

In an extended CP, too, the PRS is not mapped to OFDM symbol 0, 1, 2, and 3 to which the PDCCH can be mapped. Also, the PRS is not mapped to the OFDM symbol to which the CRS can be mapped. In one OFDM symbol, two REs are allocated for a PRS. The two REs are spaced 6 sub-carriers apart from each other along the frequency axis (like 1, 7).

In other words, FIGS. 15 and 16 illustrate in which pattern the PRSs are mapped within a default area comprising two RBs. The pattern of PRSs observed in the default area is called a PRS pattern.

In the case of an NCT, the PDCCH area may not be defined in the PRS frame, and transmission of a CRS may be restricted. Therefore, at the time of generating a PRS pattern, it can be useful to adjust a transmission restriction OFDM symbol. In this case, the following method can be considered.

1. Extension of a PRS Pattern to the Whole OFDM Symbols

In other words, to improve transmission efficiency of a PRS, the whole OFDM symbols within a subframe can be utilized.

2. Extension of a PRS Pattern to a CRS Area (However, PDCCH Transmission OFDM Symbols can be Excluded)

To improve transmission efficiency of a PRS, the PRS can be transmitted even in the CRS transmission area. However, in case an existing carrier is present at the same frequency, the PRS may not be transmitted in the PDCCH transmission area to reduce interference influencing on the PDCCH area of a neighboring cell.

3. Extension of a PRS Pattern to the PDCCH Area (However, CRS Transmission OFDM Symbols can be Excluded)

To improve transmission efficiency of a PRS, the PRS can be transmitted even in the PDCCH transmission area. However, the PRS may not be transmitted to the area of a subframe to which a TRS having the same pattern as the CRS can be transmitted.

4. Using the Same Pattern Used for an Existing Carrier

To improve transmission efficiency of an existing carrier and a PRS, transmission range of the PRS is extended to the PDCCH transmission area. However, the PRS may not be transmitted to the area of a subframe to which a TRS having the same pattern as the CRS can be transmitted.

Among the methods above, the methods 1 and 3 or methods 1 and 4 determine the PRS subframe according to whether the PRS subframe is a TRS subframe or not. Besides the methods above, a PRS subframe can be made not to overlap with a TRS subframe, or the TRS subframe can be made to skip transmission of the PRS subframe.

The methods 1 to 4 can be used in a configurable manner. In particular, in case an existing carrier and an NCT are present in a common channel or only the NCT is present therein, it is useful to have the methods 1 and 4 or the methods 3 and 4 set in a configurable manner to avoid CRS collision with neighboring cells according to whether frame synchronization is established in the NCT.

Figure 17:
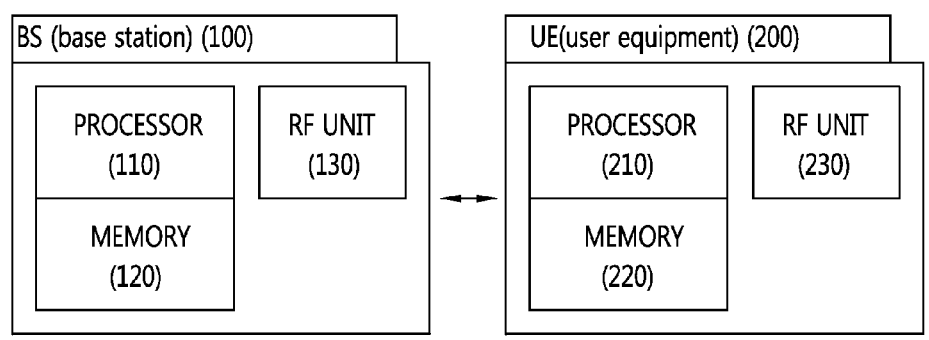
FIG. 17 is a block diagram of a wireless communication device to which an embodiment of the present invention is applied.

FIG. 17 is a block diagram of a wireless communication device to which an embodiment of the present invention is applied.

Each site can have a base station and a UE.

The base station 100 comprises a processor 110, a memory 120, and a Radio Frequency (RF) unit 130. The processor 110 implements proposed functions, processes and/or methods. The memory 120 is connected to the processor 110 and stores various types of information for driving the processor 110. The RF unit 130 is connected to the processor 110 and transmits and/or receives radio signals. A particular base station can allocate resources to other base stations using the same frequency band on the basis of resource allocation units.

A UE 200 includes a processor 210, a memory 220, and an RF unit 230. The processor 210 implements proposed functions, processes and/or methods. The memory 220 is connected to the processor 210, and stores various types of information for driving the processor 210. The RF unit 230 is connected to the processor 210, and transmits and/or receives radio signals.

The processor 110, 210 may include Application-Specific Integrated Circuits (ASICs), other chipsets, logic circuits, data processing devices and/or converters for mutually converting baseband signals and radio signals. The memory 120, 220 may include Read-Only Memory (ROM), Random Access Memory (RAM), flash memory, memory cards, storage media and/or other storage devices. The RF unit 130, 230 may include one or more antennas for transmitting and/or receiving radio signals. When an embodiment is implemented in software, the above-described scheme may be implemented as a module (process, function, etc.) for performing the above-described function. The module may be stored in the memory 120, 220 and executed by the processor 110, 210. The memory 120, 220 may be placed inside or outside the processor 110, 210 and connected to the processor 110, 210 using a variety of well-known means.

What is claimed is:

1. A method for receiving a Multimedia Broadcast Multicast Service (MBMS) communication or a non-MBMS communication on a Multicast Broadcast Single Frequency Network (MBSFN) subframe in a wireless communication system, the method performed by a user equipment (UE) and comprising:

receiving MBSFN information, which is broadcasted, indicating a specific subframe in a frame;

determining whether the UE supports the MBMS communication or not; and receiving the MBMS communication or the non-MBMS communication on the specific subframe based on whether the UE is determined to support the MBMS communication or not and the MBSFN information, wherein usage of the MBSFN information and information indicated by the MBSFN information vary depending on whether the UE supports the MBMS communication or not, wherein if the UE does not support the MBMS communication, the MBSFN information is used for only indicating an extended Cyclic Prefix (CP) subframe, and if the UE supports the MBMS communication, the MBSFN information is used for respectively indicating an MBSFN subframe among the plurality of subframes, wherein if the UE does not support the MBMS communication, an extended CP subframe is indicated as the specific subframe by the MBSFN information and the UE receives the non-MBMS communication on the extended CP subframe, and wherein if the UE supports the MBMS communication and a cell specific reference signal (CRS) is not configured to all of a plurality of subframes included in the frame, only the MBSFN subframe in the frame is respectively indicated as the specific subframe by the MBSFN information and the UE receives the MBMS communication on the MBSFN subframe.

2. The method of claim 1, wherein, on the MBSFN subframe, the UE receives a signal transmitted from a plurality of base stations through the same frequency.

3. A user equipment (UE) apparatus for receiving a Multimedia Broadcast Multicast Service (MBMS) communication or a non-MBMS communication on a Multicast Broadcast Single Frequency Network (MBSFN) subframe in a wireless communication system, the UE comprising:
   a transceiver configured to transmit and receive a radio signal; and
   a processor connected to the transceiver,
   wherein the processor is configured to:
      control the transceiver to receive MBSFN information, which is broadcasted, indicating a specific subframe in a frame,
      determine whether the UE supports the MBMS communication or not, and
      control the transceiver to receive the MBMS communication or the non-MBMS communication on the specific subframe based on whether the UE is determined to support the MBMS communication or not and the MBSFN information,
   wherein usage of the MBSFN information and information indicated by the MBSFN information vary depending on whether the UE supports the MBMS communication or not,
   wherein if the UE does not support the MBMS communication, the MBSFN information is used for only indicating an extended Cyclic Prefix (CP) subframe, and if the UE supports the MBMS communication, the MBSFN information is used for respectively indicating an MBSFN subframe among the plurality of subframes,
   wherein if the UE does not support the MBMS communication, an extended CP subframe is indicated as the specific subframe by the MBSFN information and the UE receives the non-MBMS communication on the extended CP subframe, and
   wherein if the UE supports the MBMS communication and a cell specific reference signal (CRS) is not configured to all of a plurality of subframes included in the frame, only the MBSFN subframe in the frame is respectively indicated as the specific subframe by the MBSFN information and the UE receives the MBMS communication on the MBSFN subframe.

4. The UE of claim 3, wherein, on the MBSFN subframe, the UE receives a signal transmitted from a plurality of base stations through the same frequency.

* * * * *